UNITED STATES PATENT OFFICE.

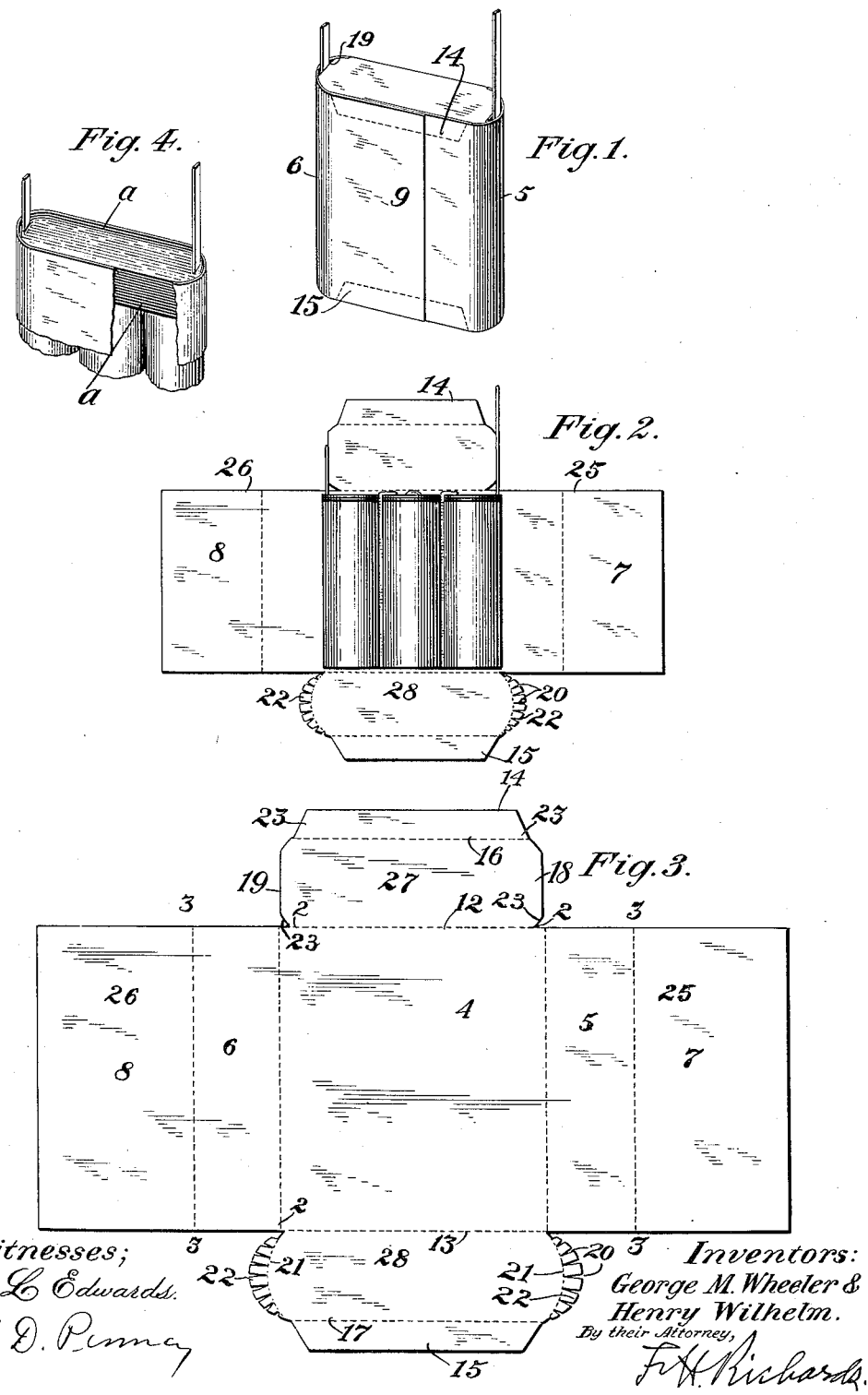

GEORGE M. WHEELER AND HENRY WILHELM, OF BROOKLYN, NEW YORK.

BATTERY.

No. 880,703.  Specification of Letters Patent.  Patented March 3, 1908.

Application filed July 11, 1907. Serial No. 383,185.

*To all whom it may concern:*

Be it known that we, GEORGE M. WHEELER, a citizen of the United States, residing at Brooklyn, in the county of Kings and State of New York, and HENRY WILHELM, a citizen of the United States, residing at Brooklyn, in the county of Kings and State of New York, have invented certain new and useful Improvements in Batteries, of which the following is a specification.

This invention relates to batteries, and more particularly to pocket batteries, the object of the invention being to provide a battery having an improved, readily separable flexible covering adapted to conform to the shape of the cells, so that whenever one or more of the cells proves to be defective or it is necessary to repair the battery this can be done without destroying the covering or breaking the connections between the cells.

A further object of the invention is the provision of an improved battery the covering of which may be quickly and readily attached or removed and which covering is simple in construction, inexpensive to manufacture, and inexpensive to attach, as well as durable in use.

Heretofore in the manufacture of pocket batteries, which usually comprise a series of connected cells, three in number, these cells have been inclosed in a paper wrapper or box open at its top, the space between the upper ends of the battery and the top edges of the box being filled in with pitch, see *a* Figure 4 of the drawings, for the purpose of securing the case to the battery as well as the batteries in position in the case. This mode of procedure materially increases the cost of making the batteries, as the pitch has to be applied in a hot condition, and aside from the cost thereof there is the cost of the gas to keep the pitch in a melted condition. At times the pitch does not readily flow to the outer sides of the contact springs, between them and the wrapper, and consequently it is necessary to use a blow-pipe to insure the proper flowage of the pitch, thus requiring time and labor to properly accomplish the desired result. The use of this blow-pipe oftentimes results in the melted pitch flowing over the outside of the wrapper, requiring the removal of the wrapper and the application of a new one, and also it frequently blackens the contact springs, which have to be cleaned thus requiring the expenditure of further time, aside from the time and labor required to pitch each battery. Aside from, and more serious than all the foregoing, whenever the battery proved defective because of a defect in one or more of the cells or in the connection between the cells, in order to remove such defective cell and insert a new one, or remedy the connections, it was necessary to remove all of this pitch, the removal of which not only required time and labor, but frequently broke the connections between the batteries, rendering it impossible to determine whether the defect was due to an improper or broken connection or to some defect in one or more of the cells. Not only this, but the removal of the pitch also ruined the wrapper, requiring the application of an entirely new wrapper; and when it is remembered that these batteries are manufactured and sold for a few cents, and that the cost of the wrapper is a material item in the cost of manufacture, it will be readily perceived that the disadvantages hereinbefore pointed out in the manufacture of batteries with the old construction of wrapper were many and the construction costly from a comparative standpoint. Our present improvement is therefore intended to do away with these disadvantages and to materially lessen the cost of manufacture of the batteries, and to this end, as hereinbefore stated, we have provided a battery having a readily separable wrapper or case in which the use of pitch is entirely avoided.

In the drawings accompanying and forming part of this specification, Fig. 1 is a perspective view of this improved form of pocket battery; Fig. 2 is a side view of the battery cells and spring contacts, with this improved wrapper in position to be folded around the cell; Fig. 3 is an enlarged plan view of the wrapper or wrapper blank; and Fig. 4 is a perspective view of the upper portion of the old style pocket battery, showing at *a* how the pitch heretofore used was applied between the tops of the cells and the upper edge of the box or case.

Similar characters of reference indicate corresponding parts throughout the different figures of the drawings.

In the present improvement we provide a wrapper blank cut in the form in which it is to be used, and comprising a main or central portion 4, having a pair of side extensions or wings 25 and 26 and top and bottom wings 27 and 28. Each of the extensions or wings 25 and 26 is formed by marking or scoring the blank as at 2, 2 and 3, 3 so that when the wrapper is folded the main or central portion 4 will form one side, with the wings or side extensions 25 and 26 forming a pair of ends 5, 6 and a pair of side flaps 7, 8 adapted to overlap and be pasted or held together by means of a label and form the other side 9, Fig. 1. The top and bottom wings 27 and 28 are also formed by marking the same off from the main portion or side 4, as at 12 and 13, to enable the same to be readily folded over the top and bottom of the cells. Each of the top and bottom wings or extensions is provided with a tongue or flap portion 14 and 15, obtained by marking off the same, as at 16 and 17. The top flap has cut-away portions formed by having its two end edges relatively straight, as at 18 and 19, to permit the contact springs to project outwardly between the ends 5 and 6 of the wrapper and the end edges of the top flap 27, while its ends at the points of juncture with the side 4 and flap 14 are preferably beveled, as at 23, to facilitate the proper folding of the flap. The lower or bottom wing or flap has its two end portions slitted, as at 20, and marked off in a curved line, as at 21, to enable the tongues 22 so formed to be turned upwardly and properly crimped around the curved end walls of the two outer cells.

It will be noted that in the preferred form shown each wing forming the wings 7 and 8, or top and bottom wings 27 and 28, is in the form of a duplex or two-part flap, that is to say, each is made up of two portions, one extending in one direction and the other in the opposite direction around the battery.

The wrapper or box is usually made of pasteboard or some stiff but flexible material or paper and is assembled in the manner shown in Fig. 2, the top and bottom flaps being first bent in position as shown in dotted lines, Fig. 1, with the tongues 22 properly folded or crimped around the lower end walls of the two outer cells and with the flaps 14 and 15 turned toward each other. The wings 7 and 8 are then folded around the cells with the portions 7, 8 overlapping each other and suitably pasted or held in place by a label the removal of which enables the wrapper to be quickly removed from the cells and avoids the necessity of the use of pitch to hold the wrapper in place. The marking off of the wings at the points 2 and 3 enables the parts 5 and 6 to properly and readily conform to the curved formation of the end walls of the two outer battery cells, so that when the battery is completed and its protecting wrapper in place it presents a neat and compact battery and one which can be readily manufactured without the use of pitch, and therefore without any of the disadvantages hereinbefore pointed out, and at a less cost than heretofore.

From the foregoing it will be seen that we provide an improved pocket battery having a cover of flexible material adapted to conform to the outlines of the cells of such battery and readily attached thereto without the use of pitch, and when attached, enabling the cells to be readily removed therefrom without the destruction thereof, and which wrapper will protect and keep the cells together and adapt them to be readily inserted in the cases now in use carrying the light bulb and the push button, without the necessity of providing a new form of case.

We claim as our invention:

1. A pocket battery comprising a plurality of cells, and a readily removable wrapper of flexible material comprising a central portion having a pair of side extensions folded around said cells to inclose them and also having a top and bottom extension folded over the ends of said cells.

2. A pocket battery comprising a plurality of cells, and a readily removable wrapper of flexible material comprising a central portion having a pair of side extensions folded around said cells to inclose them and also having a top and bottom extension folded over the ends of said cells, each of said top and bottom extensions having a tab or portion projecting within said side extensions.

3. A pocket battery comprising a plurality of cells having metallic contacts connected thereto, and a readily removable wrapper of flexible material comprising a central portion having a pair of side extensions folded around said cells to inclose them and also having a top and bottom extension folded over the ends of said cells, said top extension having cut-away portions for the passage of said metallic contacts.

4. A pocket battery comprising a plurality of cells, and a readily removable wrapper of flexible material comprising a central portion having a pair of side extensions folded around said cells to inclose them and also having a top and bottom extension folded over the ends of said cells, said bottom extension having a tab or portion projecting within said side extensions and also having a pair of upwardly turned crimped or tongued ends projecting within said side extensions.

5. A pocket battery comprising a plurality of cells having metallic contacts, and a readily removable wrapper of flexible material comprising a central portion having a pair of side extensions each of substantially the same area as said central portion and folded around said cells to inclose them, one side extension overlapping the other, said central portion also having a top and a bottom extension folded over the ends of said cells and each provided with an inwardly projecting tab or portion extending within said side extensions, said top extension having cut-away portions for the passage of said metallic contacts and said bottom extension having a pair of upwardly turned crimped or tongued ends also projecting within said side extensions.

6. A pocket battery comprising a plurality of cells, and a cover of flexible material bendable around and conforming to the shape of said cells and readily removable therefrom, and comprising a central portion having a pair of side extensions and a top and bottom extension, said top and bottom extensions having infolded portions projecting within said side extensions.

7. A pocket battery comprising a plurality of cells, and a flexible cover folded therearound and conforming to the curved shape of said cells and comprising a central portion having four extensions, one at each edge, each of said extensions bendable around a portion of said cells thereby to completely inclose the same.

8. A pocket battery comprising a plurality of cells, and a flexible cover folded therearound and conforming to the curved shape of said cells and comprising a central portion having four extensions scored or creased along parts thereof and bendable around a portion of said cells thereby to completely inclose the same.

9. A battery comprising a plurality of cells, and a flexible cover therefor folded around the cells and conforming to the curved outlines thereof and readily removable therefrom, and comprising a one-piece strip of sufficient length to fold around the cells and having top and bottom extensions overlapping the ends of such cells.

Signed at 9 to 15 Murray street, New York N. Y.

GEORGE M. WHEELER.
HENRY WILHELM.

Witnesses:
C. A. WEED,
F. E. BOYCE.